(12) United States Patent
Gustavsson

(10) Patent No.: US 7,771,768 B2
(45) Date of Patent: Aug. 10, 2010

(54) FOOD PACKAGING METHOD

(75) Inventor: Martin Gustavsson, Göteborg (SE)

(73) Assignee: Micvac AB, Molndal (SE)

( * ) Notice: Subject to any disclaimer, the term of this patent is extended or adjusted under 35 U.S.C. 154(b) by 1260 days.

(21) Appl. No.: 10/535,421

(22) PCT Filed: Sep. 23, 2003

(86) PCT No.: PCT/SE03/01474

§ 371 (c)(1),
(2), (4) Date: Dec. 12, 2005

(87) PCT Pub. No.: WO2004/045985

PCT Pub. Date: Jun. 3, 2004

(65) Prior Publication Data

US 2006/0134289 A1 Jun. 22, 2006

(30) Foreign Application Priority Data

Nov. 20, 2002 (SE) .................................. 0203420

(51) Int. Cl.
*A23L 3/10* (2006.01)
*B65D 81/34* (2006.01)

(52) U.S. Cl. .................. 426/521; 426/113; 426/234

(58) Field of Classification Search .................. 426/234, 426/521; 220/203.27
See application file for complete search history.

(56) References Cited

U.S. PATENT DOCUMENTS

| | | | |
|---|---|---|---|
| 4,859,822 A | 8/1989 | Ragusa et al. | |
| 5,780,824 A * | 7/1998 | Matos | ......................... 219/727 |
| 6,437,305 B1 * | 8/2002 | Haamer | ....................... 219/735 |

FOREIGN PATENT DOCUMENTS

| | | |
|---|---|---|
| EP | 1 127 810 A2 | 8/2001 |
| WO | WO 00/03605 | 1/2000 |

OTHER PUBLICATIONS

Snyder jr., O.P., Safety of Pasteurized-Chilled Food, 1997, Hospitality Inst. of Tech., and Mgmt, found on the internet at http://www.hi-tm.com/Documents/Chillfd.html.*

* cited by examiner

*Primary Examiner*—C. Sayala
*Assistant Examiner*—Jerry W Anderson
(74) *Attorney, Agent, or Firm*—Harness, Dickey & Pierce, P.L.C.

(57) ABSTRACT

A method of pasteurising and vacuum packing food (2), comprising the steps of placing the food (2) on a tray 81 having a flexible bottom (7) and stiff lateral walls (8) extending in the vertical direction of the tray (1), up to a filling degree of 410-60% of the maximum volume of the tray (1), covering the tray (1) with a flexible cover layer (3) to form a package, providing a one-way valve (4) for one-directional communication from the interior of the package (5) to the exterior thereof, pasteurising the contents inside the package (5) thus formed by means of microwaves, closing the valve (4) upon completed pasteurisation of the package and cooling the package (5), whereby a vacuum is created in the package (5) in such a manner that the package (5) with the vacuum-packaged food (2) therein presents a centre portion where the distance between said flexible cover layer (3) and said bottom (7) is shorter than the distance between said flexible cover layer (3) and said bottom (7) at the peripheral edges of the package.

18 Claims, 5 Drawing Sheets

FOOD PACKAGING METHOD

TECHNICAL FIELD

The present invention relates to a method of pasteurising and vacuum-packing food and to a package to be used in the implementation of said method.

BACKGROUND OF THE INVENTION

When ready-to-eat factory-prepared dishes are to be heated in microwave ovens, the package contents will as a rule be unevenly heated. One manner of remedying this drawback is to arrange a material of a special kind in the package in those portions of the package contents that normally are heated to a lesser degree than other portions. This special material is chosen for its capacity to improve absorption of the microwaves and consequently the package contents located in the area where the special material is present are heated indirectly via the high-absorption material. One alternative is to use materials that rather than absorbing microwaves actually prevent such waves from reaching their target. This kind of material therefore is positioned in the area of the package that normally receives most heat. Packages fitted with integrated special materials obviously are more expensive to produce while at the same time they add to the complexity of the manufacturing process.

Furthermore, the keeping qualities of ready-to-eat food kept under refrigeration are limited in the case of traditionally packaged heat-and-eat dishes. The prepared food is transferred to packages, which are then subjected to a vacuum pressure, alternatively are filled with an inert gas, such as carbon dioxide. Vacuum-packing often is not sufficient to ensure the keeping qualities of the ready-cooked food inside the package over longer periods. The transfer of the ready-cooked food onto the package also puts the food into contact with the surrounding air, which further shortens the period of freshness of the food.

SUMMARY OF THE INVENTION

The object of the present invention thus is to provide a method of packing food, and a package used to implement said method, thus providing a solution to the problems outlined in the introduction.

This object is achieved in accordance with the invention by means of a method possessing the characteristics defined in the appended claim 1, preferred embodiments being defined in the appended claims 2-4. The object is also achieved by means of a package as defined in the appended claims 5-12.

The inventive method of pasteurising and vacuum packing food comprises the steps of placing the food on a tray having a flexible bottom and stiff lateral walls or rims extending in the vertical direction of the tray, up to a filling degree of 40-60% of the maximum volume of the tray, covering the tray with a flexible cover layer to form a package, providing a one-way valve for one-directional communication from the interior of the package to the exterior thereof, pasteurising the contents inside the package thus formed by means of microwaves, closing the valve upon completed pasteurisation of the package and cooling the package, whereby a vacuum is created in the package in such a manner that the package with the vacuum-packaged food therein presents a centre portion where the distance between said flexible cover layer and said bottom is shorter than the distance between said flexible cover layer and said bottom at the peripheral edges of the package.

Because the transfer of the food to the package takes place prior to the pasteurisation step, the risk of contamination of the food is reduced. The pasteurisation takes place under excess pressure inside the package, and it is mostly vapour that exits through the valve. As the heating stops, the valves closes and the package is cooled, whereby a vacuum is created inside the package due to condensation. Since the package is formed with a flexible bottom and since also the cover layer is flexible, the package will, once a vacuum is established inside the package, have a distance from said flexible cover layer to the flexible bottom that is shorter than the height of the lateral edges. When the packaged food is to be prepared for consumption or be heated, this difference in distance will result in the food in the package being evenly heated, since more microwave energy will be supplied to the edges, where the quantity of food is the largest, and less energy be supplied to the middle, where there is less food. In conventional packages for ready-to-eat dishes the distance between the cover layer and the bottom is equal throughout the entire package.

Preferably, the one-way valve is provided on said flexible cover layer. This arrangement presents the advantage of preventing any food from blocking the valve, since during heating the vapour then being generated will lift the cover layer to a level above the food.

In order to simplify the manufacturing process, the valve preferably is arranged on the flexible cover layer before the latter is applied on top of the tray.

In accordance with a preferred embodiment of the present invention the food includes all ingredients necessary for a ready-to-eat dish. This means that only heating of a package holding all ingredients is required to obtain a ready meal.

Preferably, the tray has a convex shape as seen from below during the filling and pasteurisation steps, whereas the finished package with the food therein, i.e. when a vacuum pressure exists in the package, the bottom of the tray has a concave shape as seen from below. The advantage gained by imparting to the tray a basically convex shape as seen from below is that it eliminates the risk that the food will "jump" off the tray. Since the basic shape of the tray is such that it comprises a concave bottom (as seen from below), it tends to resume its shape. As a result, should a tray of such originally concave shape for some reason, for example after the final heating, still have a convex shape, there is a risk that suddenly it will resume its original position, i.e. the bottom will bulge upwards into the tray and any food therein may "jump" off the tray, if the covering film has been removed.

Preferably, the bottom of the tray presents one section that is essentially flat. Since the bottom of the tray has a convex shape as seen from below the package/tray will be able to rest steadily supported on its flat section. According to one preferred embodiment this flat section forms more than 40% of the total area of the bottom.

In addition, the valve preferably consists of a slit formed in said flexible cover layer and a reclosable adhesive film extending across the slit. The adhesive preferably is adapted for a suitable magnitude of opening resistance, i.e. the valve will open in response to a predetermined excess pressure inside the package. Because the valve has a predetermined resistance to opening, the heat spreads more efficiently, since vapour from those portions of the food enclosed in the package that are heated most spreads over the entire package interior, thus heating the colder food portions. A valve of this kind also possesses the advantages of being simple, inexpensive to produce, requiring little space and may be used to display e.g. informative texts, lists of contents, and so on. By configuring the valve in a particular way it is likewise possible to make the valve emit a sound signal as vapour is flowing through the valve. The magnitude of the resistance to opening may be adapted to permit the valve to open only when the heating of the contents inside the package is completed, in which case the signal therefore indicates that the heating of the contents is completed.

In accordance with one preferred embodiment the section of the tray that is located at the peripheral edge of the bottom is at an angle to the direction of extension of the tray. The transition from these oblique sections to the flat section of the bottom forms so called flex edges or alternatively one flex edge about which flex edge(s) the flat bottom portion may move relative to the oblique or slanted portion close to the peripheral edges of the bottom. This solution allows continuous flexing of the bottom of the tray.

BRIEF DESCRIPTION OF THE DRAWING FIGURES

The invention will be described in more detail in the following by means of one embodiment with reference to the accompanying drawings, wherein.

DESCRIPTION OF PREFERRED EMBODIMENTS

Figure 1A:
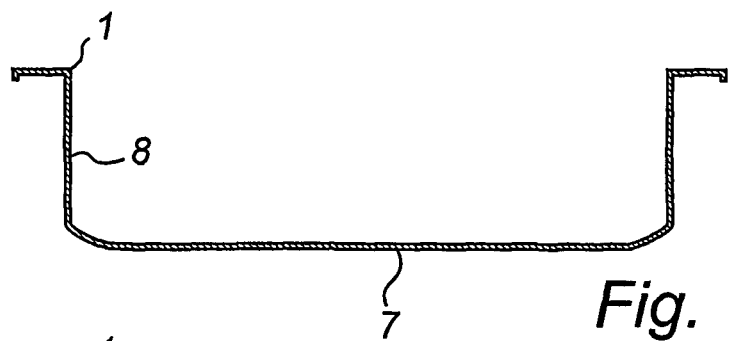
FIGS. 1a-1f illustrate the method of pasteurising and vacuum-packing food in accordance with the present invention.
Figure 1B:
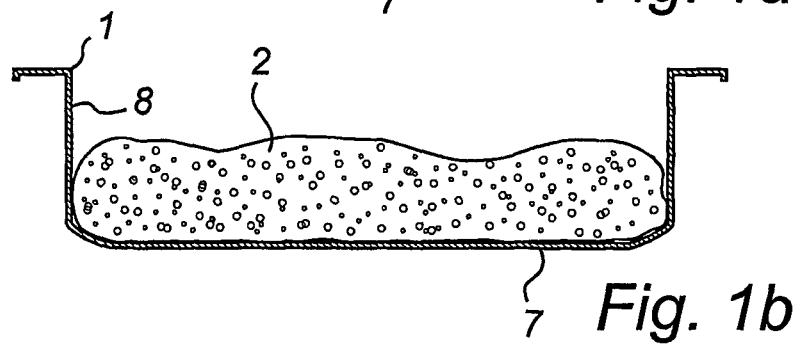
Figure 1C:
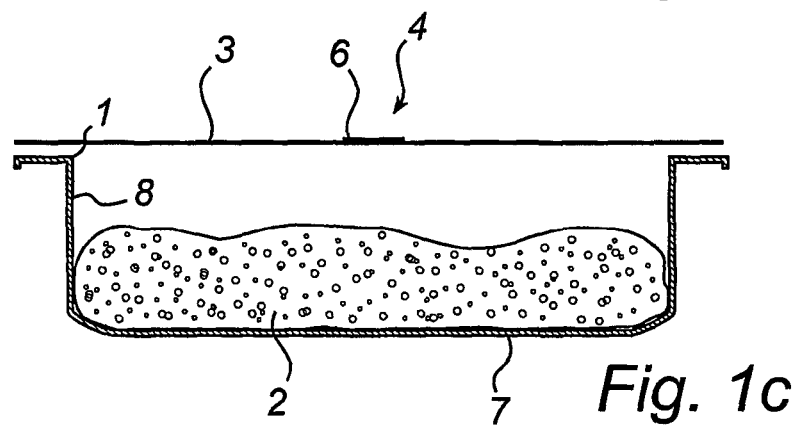
Figure 1D:
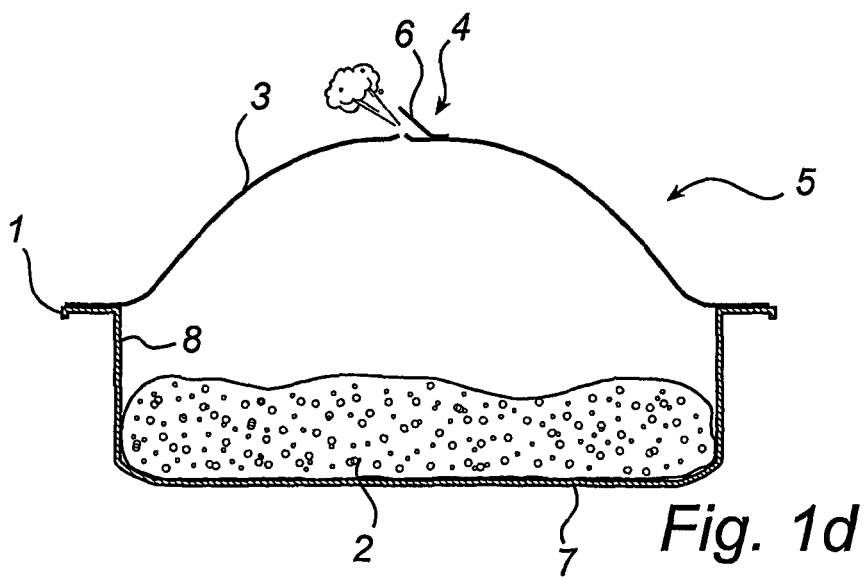
Figure 1E:
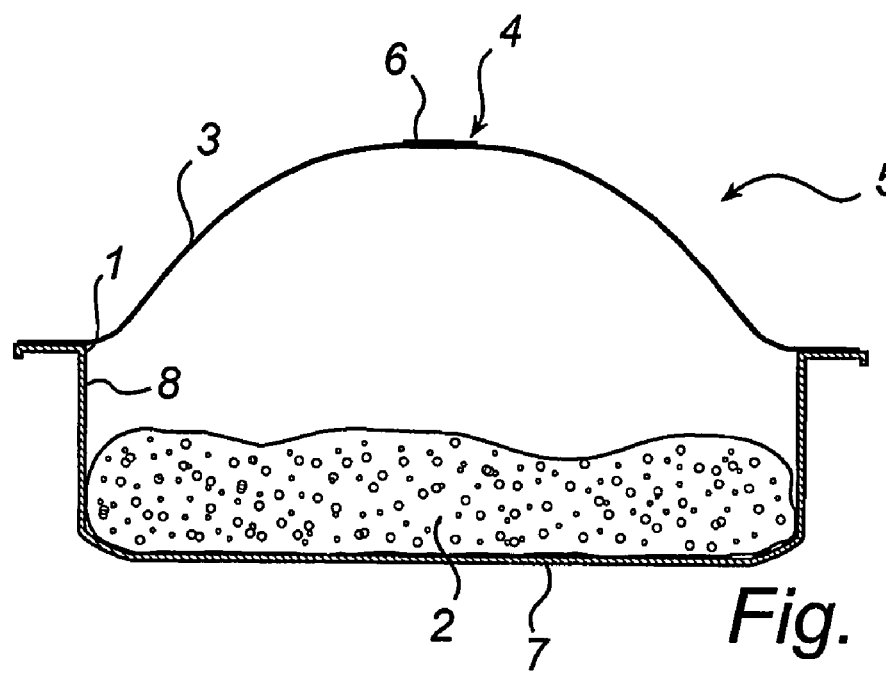
Figure 1F:
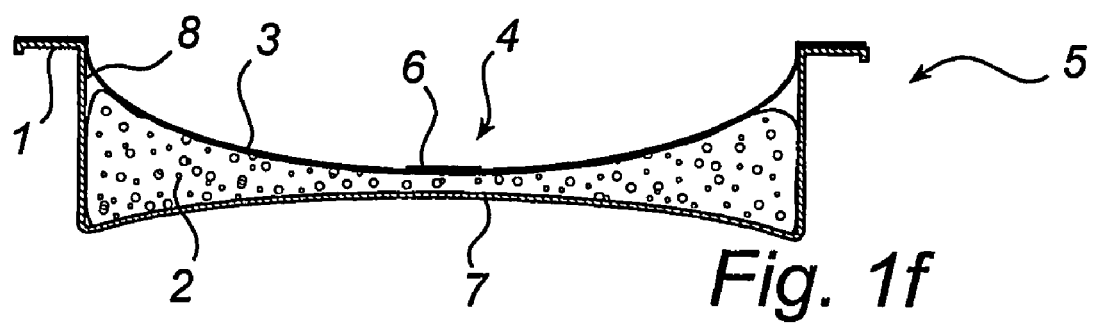

FIG. 1a illustrates a tray 1, which is filled with the desired food 2, FIG. 1b, to a filling degree of about 40-60%, depending on the kind of food 2 to be packed. FIG. 1c shows the manner of application on the tray 1 of a flexible cover layer 3 fitted with a one-way valve 1. The package 5 thus formed is then exposed to the effects of microwaves whereby the food 2 is pasteurised, FIG. 1d, and the valve 4 permits vapour to exit from the package 5. The valve 4 is in the form of a tape applied across a slit made in the flexible cover layer 3. At the same time as the heating by means of the microwaves ceases, the valve 2 closes, see FIG. 1e. Preferably the movable part 6 of the valve 4, i.e. the adhesive layer 6, is designed to automatically reclose the valve, when the heating ceases and the excess pressure inside the package 5 decreases somewhat. Alternatively, this effect could be achieved by purely mechanical means that close the valve 4 as the package is being conveyed on a production line. Owing to the condensation arising inside the package 5 a vacuum pressure is generated therein, see FIG. 1f. The effect of the combination of a predetermined degree of filling of the package and the fact that the bottom 7 of the tray 1 and the cover layer 3 are flexible is that in the centre part of the package 5 the distance between said flexible cover layer 3 and said bottom 7 will be shorter than the distance between said flexible cover layer 3 and said bottom 7 in the peripheral parts of the package. The tray 1 preferably is formed with rigid lateral rims 8, such that the change of volume consequently will be caused by to the bottom 7 and the flexible cover layer 3.

Figure 2A:
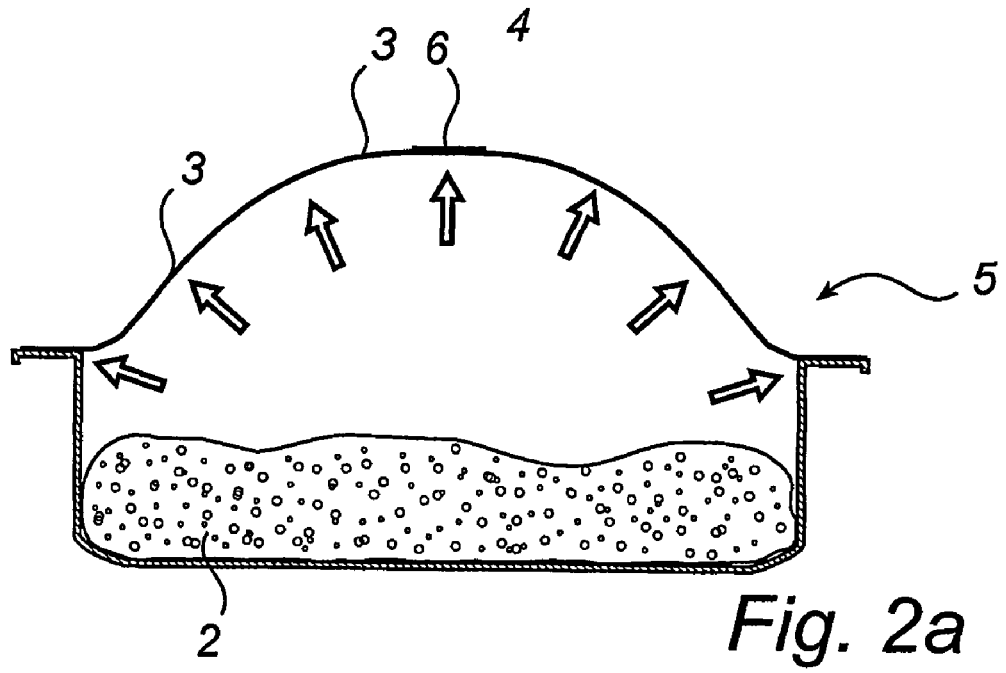
FIGS. 2a-2b illustrate the package during the final heating.
Figure 2B:
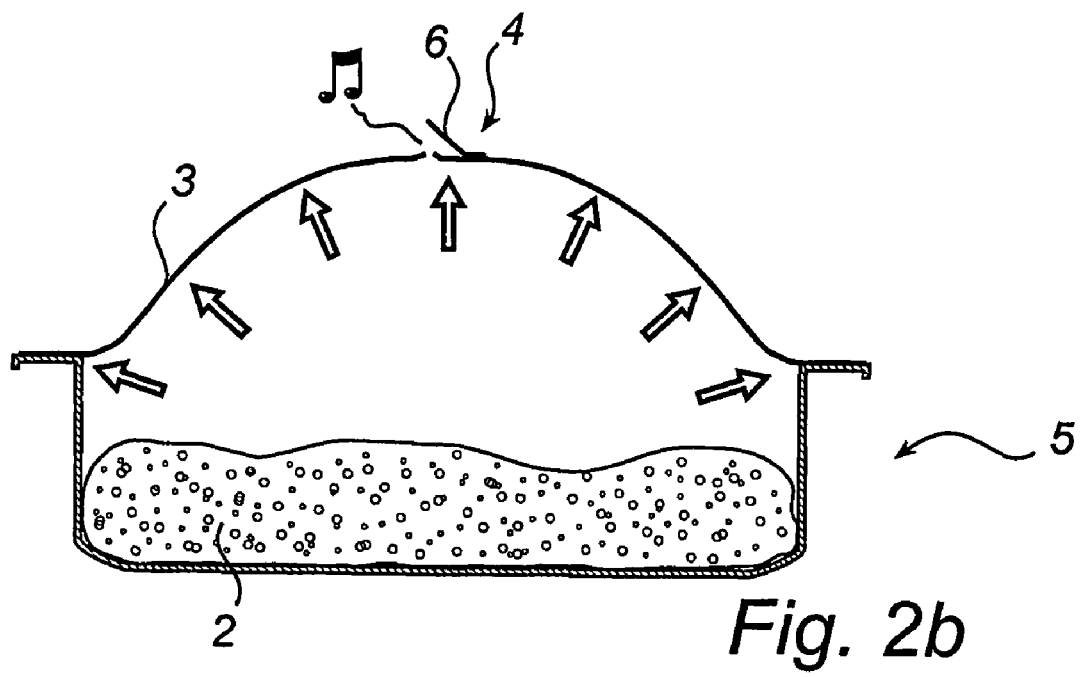

When a package 5, prepared by implementation of the method set forth above, is to be heated preparatory to final consumption of the food 2 enclosed in the package 5, the latter is positioned inside a microwave oven. After a while vapour generates inside the package and it spreads, see FIG. 2a, therein, thus contributing to heating the food evenly. The design of the package 5, with a package centre that is thinner than the package edges, furthermore attributes to the food being heated more evenly, since in a conventional microwave oven the microwaves are concentrated to the edges of a package. Preferably, the valve 4 is adapted to open when the food 2 inside the package 5 has reached its fully, heated state. In accordance with a preferred embodiment of the present invention the valve 4 is designed to emit a sound signal when vapour flows through the valve 4, see FIG. 2b. In other words, the sound signal indicates that the contents of the package are ready to be consumed.

Figure 3:
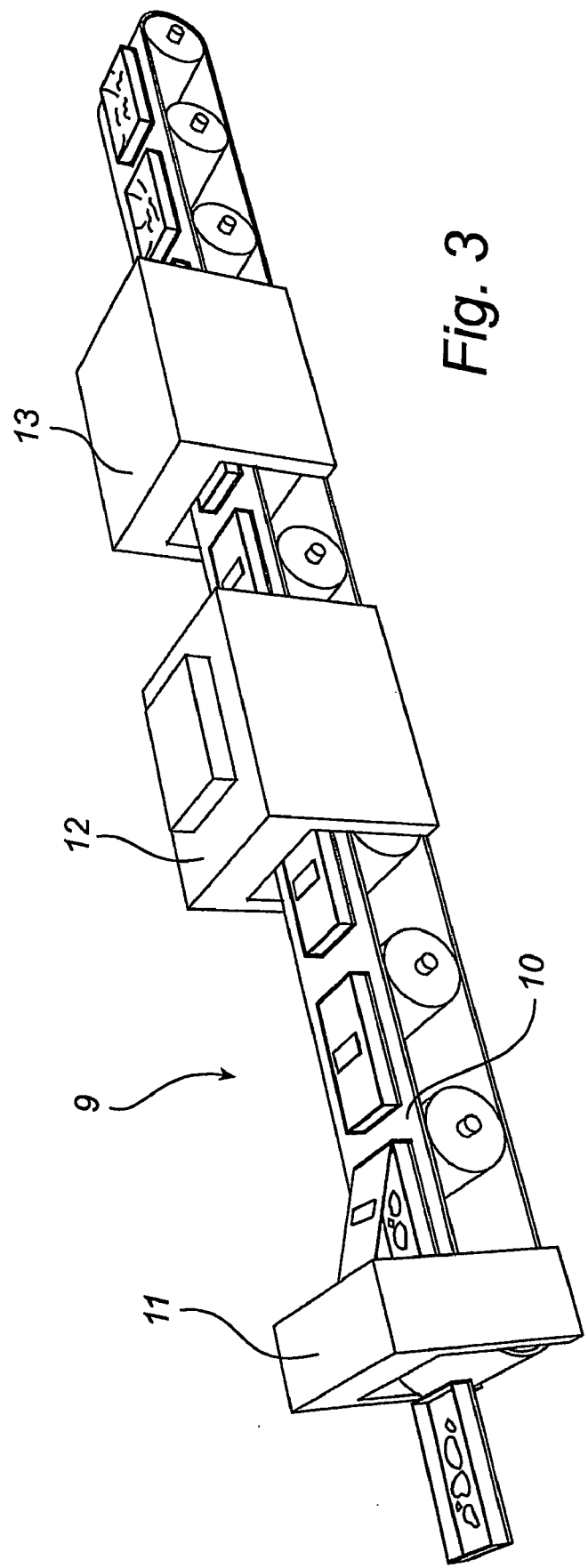
FIG. 3 illustrates one example of a production line that may be used in the implementation of the method in accordance with the present invention.

FIG. 3 shows one example of a production line 9, comprising a conveyor belt 10, a cover layer applicator 11, a microwave tunnel 12 and a cooling tunnel 13. A tray 1, filled with food 2 to the desired filling degree, is placed on the belt 10. A flexible film or cover layer 3 is applied on top of the tray 1 in the cover layer applicator 11 and thereafter the package 5 thus formed is introduced into the microwave tunnel 12, wherein the food 2 contained in the package 5 is pasteurised. When the package 5 enters the microwave tunnel 12 the valve 4 formed in the package is closed. The food 2 is heated inside the microwave tunnel 12 and the pressure gradually increases, until it exceeds a predetermined value in response to which the valve 4 is arranged to open. The residence time in the microwave tunnel 12 is set to ensure achievement of optimum food-pasteurisation results. At the end of the microwave tunnel 12, the valve 4 closes. The package 5 with the thus pasteurised food 2 contained therein is forwarded to the cooling tunnel 13, wherein the contents of the package 5 condenses, whereby a vacuum pressure is generated. The package 5 is now ready for further distribution to selling points. It is thus possible to use the method in an industrial process with the advantage of it being a continuous process. The time required for packaging inclusive of preparation (pasteurisation) of the food amounts to some minutes. In comparison with conventional methods on the market, the time requirements for the steps of pasteurisation and vacuum-packing of food in accordance with the present invention are but a fraction of the time necessary in conventional methods and in addition the food-keeping qualities are higher.

Figure 4A:
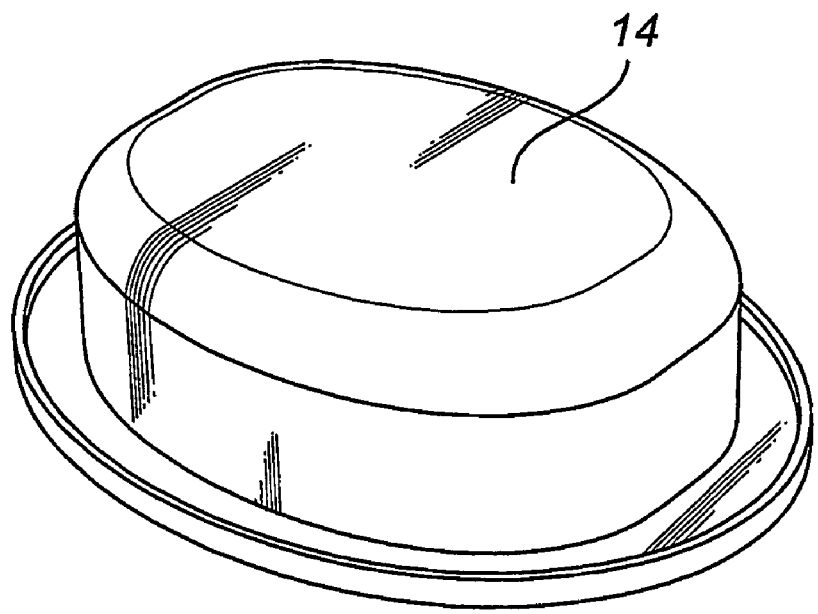
FIGS. 4a-4b are perspective views of the tray as seen obliquely from below, illustrating the latter in a normal-condition stage and a vacuum-condition stage, respectively.
Figure 4B:
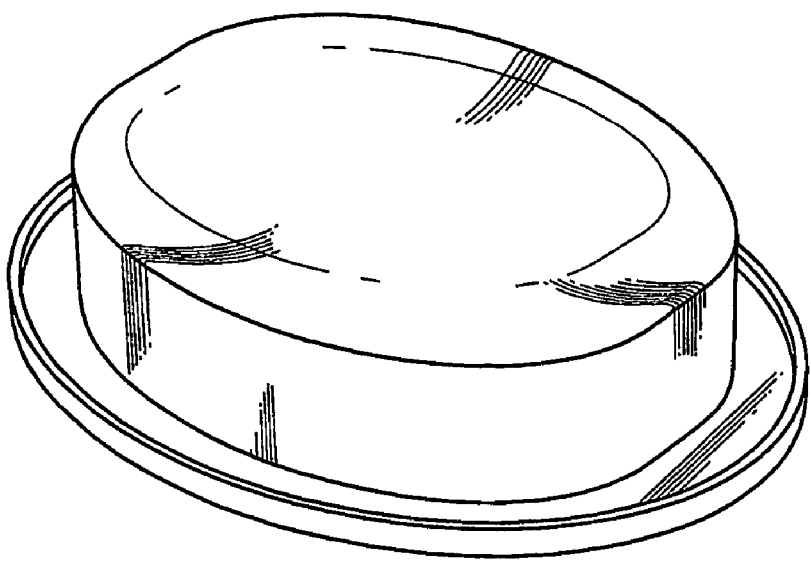

FIG. 4a shows a tray 1 is a perspective view as seen obliquely from below under conditions of equal pressure around the tray 1. One section 14 of the bottom 7 of the tray is flat. The flat section 14 gives the tray 1 sufficient stability to allow the food to be eaten straight from tray 1. When a vacuum pressure is present in the package 5, as shown in FIG. 4b, said flat section 14 and adjoining sections have bulged upwards into the package. Also in this condition the package 5 assumes a stable position but now it rests on the edges surrounding the bottom 7 of the tray 1, because of the stiffness of the walls or rims 8 of the tray 1. Owing to this design of the tray 1, the latter becomes stackable, both when it is used as a part of the package 5 and when stored prior to use.

As should be appreciated, numerous modifications of the embodiment described above are possible within the scope of protection of the invention as the latter is defined by the appended claims. For example, as described above a valve comprising a diaphragm and a diaphragm holder could be used. The flat section 14 of the bottom 9 of the tray 1 could, as an alternative, have for example a corrugated structure or a similar structure, provided that the sections of the bottom 7 in contact with the supporting surface impart stability to the tray 1. Furthermore, a tray 1 could of course be divided into several compartments, vegetables for instance being contained in one compartment, sauce in another, and so on. The invention has for its primary object to suggest methodical means for the pasteurisation and the vacuum-packing of food in containers of a size suitable for heating in conventional microwave ovens for home use. Consequently, it is of course possible to apply the method on larger-size packages for institutional catering kitchens, wherein the packages used are too large to be accommodated in conventional home-use microwave ovens. Cooling of the package following the pasteurisation step could be passive, i.e. the package may be left to cool in ambient temperatures. For rapid processes it is, however, preferably to cool actively, for example in a cooling tunnel as described above.

The invention claimed is:

1. A method of pasteurising and vacuum packing food, comprising:

placing the food on a tray up to a filling degree of 40-60% of the maximum volume of the tray, the tray having a flexible bottom and stiff lateral walls extending in the vertical direction of the tray;

covering the tray with a flexible cover layer to form a package, the flexible bottom along the periphery adjacent the lateral walls being angled causing the flexible bottom to be convex relative to the lateral walls when the package is not under vacuum;

providing a one-way valve for one-directional communication from the interior of the package to the exterior thereof;

pasteurising the contents inside the package thus formed by way of microwaves; and closing the valve upon completed pasteurisation of the package and cooling the package, a vacuum being created in the package in such a manner that the package with the vacuum-packaged food therein presents a centre portion where the distance between said flexible cover layer and said bottom is shorter than the distance between said flexible cover layer and said bottom at the peripheral edges of the package, the vacuum causing the flexible bottom to be concave relative to the lateral walls.

2. A method as claimed in claim 1, wherein the one-way valve is arranged on said flexible cover layer.

3. A method as claimed in claim 2, wherein said food includes all ingredients necessary for a ready-to-eat dish.

4. A method as claimed in claim 2, wherein said one-way valve is applied on said flexible cover layer during the step of covering said tray with the flexible cover.

5. A method as claimed in claim 4, wherein said food includes all ingredients necessary for a ready-to-eat dish.

6. A method as claimed in claim 1, wherein said food includes all ingredients necessary for a ready-to-eat dish.

7. A package for use in a method of pasteurisation and vacuum-packing food, said method comprising:

placing the food on a tray up to a filling degree of 40-60% of the maximum volume of the tray, covering the tray with a flexible cover layer, providing one-way valve for one-directional communication from the interior of the package to the exterior thereof, pasteurising the contents inside the package thus formed by way of microwaves, and closing the valve upon completed pasteurisation of the package and cooling the package, a vacuum being created in the package, and the tray including a flexible bottom and rigid lateral walls extending in the vertical direction of the tray, the flexible bottom being concave relative to the lateral walls when the package is under vacuum, the flexible bottom the periphery adjacent the lateral walls being angled causing the flexible bottom to be convex relative to the lateral walls when the package is not under vacuum, said package with vacuum-packaged food contained therein presenting a centre portion, where the distance between said flexible cover layer and said bottom is shorter than the distance between said flexible cover layer and said bottom at the peripheral edges of the package.

8. A package as claimed in claim 7, wherein the bottom of said tray has a convex shape as seen from below, when the pressure inside the package exceeds or equals the pressure exteriorly thereof.

9. A package as claimed in claim 8, wherein the bottom of the tray is formed with a section that is spaced from the periphery of the bottom, which is essentially flat.

10. A package as claimed in claim 7, wherein the bottom of the tray is formed with a section that is spaced from the periphery of the bottom, which is essentially flat.

11. A package as claimed in claim 10, wherein the tray part located at the periphery of the bottom extends at an angle to the direction of extension of the tray.

12. A package as claimed in claim 10, wherein said section forms more than 40% of the total area of the bottom.

13. A package as claimed in claim 12, wherein the valve is arranged on said flexible cover layer.

14. A package as claimed in claim 7, wherein the valve is arranged on said flexible cover layer.

15. A package as claimed in claim 14, wherein said valve includes a slit formed in said flexible cover layer and of a reclosable adhesive film extending across the slit.

16. A package as claimed in claim 7, wherein the valve is arranged to emit a sound signal when vapour is flowing through said valve.

17. A package as claimed in claim 13, wherein said valve includes a slit formed in said flexible cover layer and of a reclosable adhesive film extending across the slit.

18. A package as claimed in claim 17, wherein the valve is arranged to emit a sound signal when vapour is flowing through said valve.

* * * * *